UNITED STATES PATENT OFFICE.

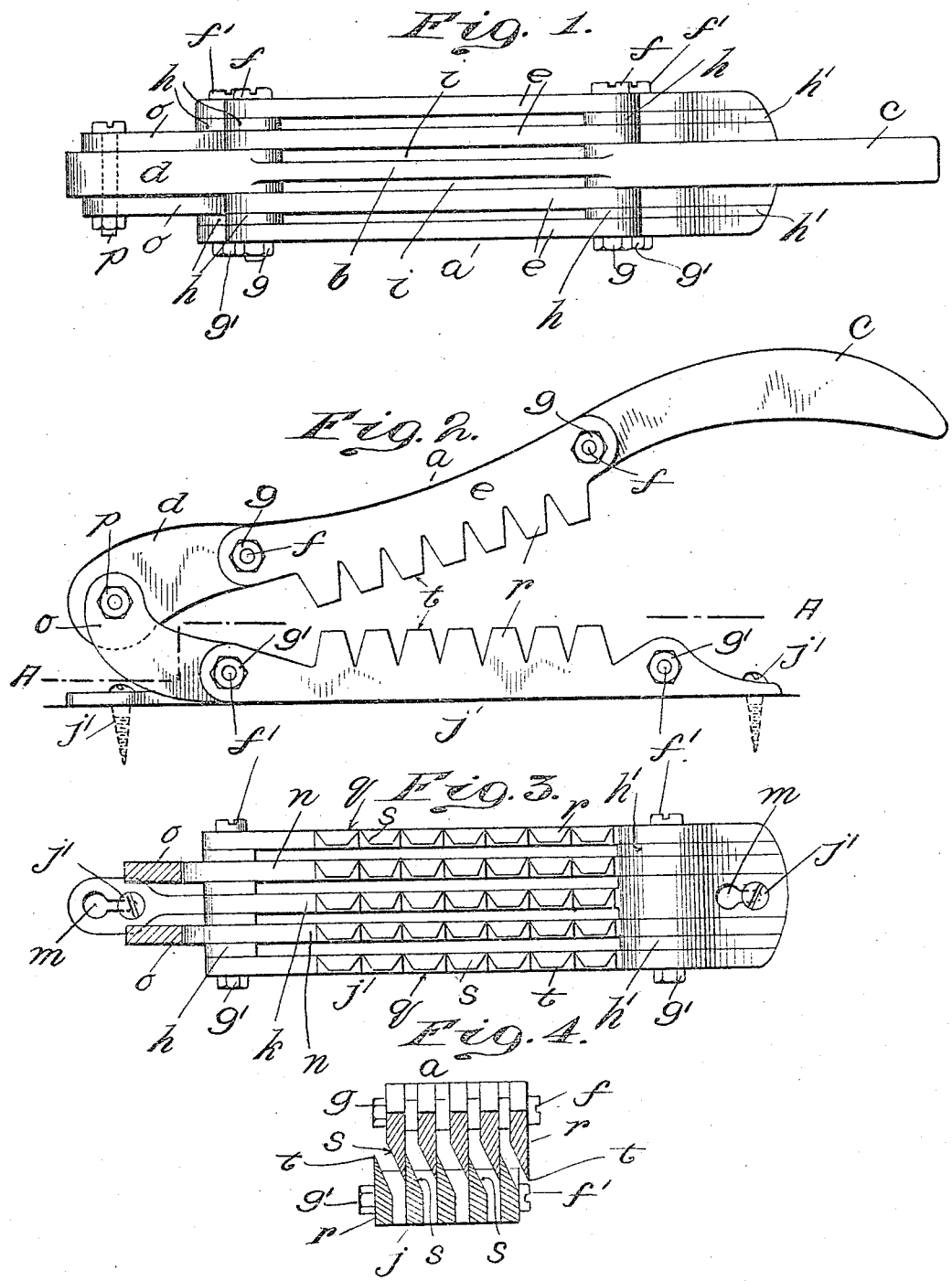

ABRAHAM G. W. FOSTER, OF NEWNAN, GEORGIA.

MEAT-TENDERER.

949,762.

Specification of Letters Patent.  Patented Feb. 22, 1910.

Application filed December 2, 1909.  Serial No. 531,018.

*To all whom it may concern:*

Be it known that I, ABRAHAM G. W. FOSTER, a citizen of the United States, residing at Newnan, in the county of Coweta and State of Georgia, have invented certain new and useful Improvements in Meat-Tenderers, of which the following is a specification, reference being had to the accompanying drawings.

My invention relates to improvements in meat tenderers; and an object of my invention is to provide a meat tenderer which will be simple in construction, relatively cheap in manufacture and most efficient in use.

In the drawings illustrating the principle of my invention and the best mode now known to me of applying that principle, Figure 1 is a plan of my new meat tenderer; Fig. 2 is a side elevation of the same; Fig. 3 is a section on the line A—A of Fig. 2; and Fig. 4 is detail in section showing the way the cutter-blades fit between each other.

The upper cutter $a$ consists of a series of cutter-blades the middle one $b$ of which is formed at one end with a handle $c$ and at its opposite end with a lug $d$. On each side of the middle cutter-blade are arranged the cutter-blades $e$ which are held together by the screw-bolts $f$ and their nuts $g$, the bolts $f$ passing through holes in the cutter-blades $b$, $e$. The cutter-blades $e$ are spaced apart by the washers $h$ mounted on the bolts $f$; and the mid-portion of the middle cutter-blade $b$ is reduced so that there exists a space $i$ between the middle cutter-blade $b$ and the cutter-blade $e$ at each side of it. The bottom cutter $j$ also consists of a series of cutter-blades the ends of the middle one $k$ of which are each formed with a keyhole-shaped slot $m$ to receive a fastening device $j'$ by which the cutter $j$ is fastened in place, as upon a table. The cutter-blades $n$ adjacent to the middle cutter-blade $j$ are each formed at one end with an ear $o$. The lug $d$ is fitted between the lugs $o$ and is fastened pivotally thereto by means of the pivot-bolt $p$. Outside of each cutter-blade $n$ is arranged a cutter-blade $q$; and the latter and the cutter-blades $n$, $k$ are fastened together by the screw-bolts $f'$ and their nuts $g'$. At one end of the cutter $j$ the cutter-blades $k$, $n$ and $q$ are held apart by washers $h$ mounted on one of the bolts $f'$ and at the other end washer-plates or spacing-plates $h'$ serve to hold spaced apart the cutter-blades $q$ from the cutter-blades $n$.

Each cutter blade is formed with a series of teeth $r$; and each of the latter is formed with an inclined face $s$ or is beveled or "mitered" to a cutting edge $t$. When the cutters $a$, $j$ are forced together with the meat between them, the meat is crushed or pressed between the beveled faces $s$ of the cutter-blades $b$, $e$ and the beveled faces $s$ of the cutter-blades $k$, $n$, $q$.

The spaced relation of the cutter-blades allows them to be cleaned readily. If any of the cutter-blades have to be replaced, this is quickly done by merely loosening the nuts $g$ or $g'$ as the case may require, after which the worn or broken cutter-blade may be removed and a new one substituted therefor.

I claim:

A meat tenderer consisting of a pair of cutters; one of said cutters being made up of a plurality of spaced cutter-blades one of which is formed with a lug and a handle; and the other of said cutters being made up of a plurality of spaced cutter-blades two of which are formed with ears between and to which said lug is pivotally fastened.

In testimony whereof I hereunto set my hand at said Newnan this 27th day of November, 1909, in the presence of the two undersigned witnesses.

ABRAHAM G. W. FOSTER.

Witnesses:
W. G. POST,
T. S. KOWLS.